(12) United States Patent
Waechter et al.

(10) Patent No.: US 9,454,437 B2
(45) Date of Patent: Sep. 27, 2016

(54) NON-VOLATILE LOGIC BASED PROCESSING DEVICE

(71) Applicants: Texas Instruments Incorporated, Dallas, TX (US); Texas Instruments Deutschland GmbH, Freising (DE)

(72) Inventors: Andreas Waechter, Bavaria (DE); Mark Jung, Bavaria (DE); Steven Craig Bartling, Plano, TX (US); Sudhanshu Khanna, Richardson, TX (US)

(73) Assignees: TEXAS INSTRUMENTS INCORPORATED, Dallas, TX (US); TEXAS INSTRUMENTS DEUTSCHLAND GMBH, Freising (DE)

( * ) Notice: Subject to any disclaimer, the term of this patent is extended or adjusted under 35 U.S.C. 154(b) by 160 days.

(21) Appl. No.: 14/309,362

(22) Filed: Jun. 19, 2014

(65) Prior Publication Data

US 2015/0089293 A1 Mar. 26, 2015

Related U.S. Application Data

(60) Provisional application No. 61/881,687, filed on Sep. 24, 2013, provisional application No. 61/886,901, filed on Oct. 4, 2013.

(51) Int. Cl.
*G06F 11/00* (2006.01)
*G06F 11/14* (2006.01)
*G06F 9/44* (2006.01)

(52) U.S. Cl.
CPC .......... *G06F 11/1417* (2013.01); *G06F 9/4401* (2013.01); *G06F 11/1469* (2013.01)

(58) Field of Classification Search
CPC ............ G06F 9/4401; G06F 11/1417; G06F 11/1469
See application file for complete search history.

(56) References Cited

U.S. PATENT DOCUMENTS 7,154,297 B1 * 12/2006 Camarota .......... H03K 19/1776
326/38
8,477,522 B2 7/2013 Clinton et al.
(Continued)

OTHER PUBLICATIONS

Texas Instruments; "Mixed Signal Microcontroller"; Product Review Datasheet, MSP430FR59xx; SLAS704, Oct. 2012; 82 pgs.
(Continued)

*Primary Examiner* — Joshua P Lottich
(74) *Attorney, Agent, or Firm* — John R. Pessetto; Charles A. Britt; Frank D. Cimino

(57) ABSTRACT

A processing device boots or wakes using non-volatile logic element (NVL) array(s) that store a machine state. A standard boot sequence is used to restore a first portion of data. A second portion of data is restored, in parallel with the standard boot sequence, from the NVL array(s). A data corruption check is performed on the second portion of data. If the second data is valid, a standard boot sequence is used to restore a third portion of data. If the second data is invalid or the boot is an initial boot, a standard boot sequence is executed to determine the second portion of data, which is then stored in the NVL array(s). The processing device restores the second portion of the data during a portion of the boot/wake process that is not reading data from other non-volatile devices to avoid overloading the respective power domain.

20 Claims, 11 Drawing Sheets

(56) References Cited

U.S. PATENT DOCUMENTS

| | | | |
|---|---|---|---|
| 8,508,974 | B2 | 8/2013 | Clinton et al. |
| 8,621,148 | B2* | 12/2013 | Eilert .................. G06F 13/385 711/117 |
| 8,717,800 | B2 | 5/2014 | Clinton et al. |
| 8,724,367 | B2 | 5/2014 | Clinton et al. |
| 9,058,126 | B2* | 6/2015 | Bartling .................. G06F 13/00 |
| 2004/0240269 | A1* | 12/2004 | Cernea .................. G11C 8/08 365/185.12 |
| 2006/0044863 | A1* | 3/2006 | Basceri .................. G11C 8/12 365/145 |
| 2012/0168837 | A1 | 7/2012 | Bartling et al. |
| 2014/0075087 | A1 | 3/2014 | Bartling et al. |
| 2014/0075088 | A1 | 3/2014 | Bartling et al. |
| 2014/0075089 | A1 | 3/2014 | Bartling et al. |
| 2014/0075090 | A1 | 3/2014 | Bartling et al. |
| 2014/0075091 | A1 | 3/2014 | Bartling et al. |
| 2014/0075174 | A1 | 3/2014 | Bartling et al. |
| 2014/0075175 | A1 | 3/2014 | Bartling et al. |
| 2014/0075218 | A1 | 3/2014 | Bartling et al. |
| 2014/0075225 | A1 | 3/2014 | Bartling et al. |
| 2014/0075232 | A1 | 3/2014 | Bartling et al. |
| 2014/0075233 | A1 | 3/2014 | Bartling et al. |
| 2014/0098619 | A1* | 4/2014 | Nazarian ............ G11C 13/0007 365/189.011 |
| 2015/0249096 | A1* | 9/2015 | Lupino ............. H01L 27/11898 257/203 |

OTHER PUBLICATIONS

Yang, S. et al; "Scan Based Methodology for Reliable State Retention Power Gating Designs"; 978-3-9810801-6-2/Date10; 2010, EDAA; 6 pages.

Cypress Semiconductor Corp.; "White Paper, F-RAM Technology Brief"; Jun. 2013; 5 pages.

Thanigai, P.; Texas Instruments; "MSP430FR57xx Fram Quality and Reliability"; Application Report, SLAA526, Mar. 2012; 8 pages.

Bartling, S. et al.; An 8MHz 75pA/MHz Zero-Leakage Non-Volatile Logic-Based Cortex-Mo MCU SoC Exhibiting 100% Digital State Retention at VDD=0V with <400ns Wakup and Sleep Transitions; ISSCC 2013; Session 24; Energy-Aware Digital Design, 24.7; Dec. 6, 2012; 3 pages.

Baumann, A. et al.; "A MCU platform with embedded FRAM achieving 350nA current consumption in real-time clock mode with full state retention and 6.5µs system wakeup time"; 2013 Symposium on VLSI Circuits Digest of Technical Papers, C202; 2 pages.

Mahmoodi-Meimand, H. et al.; "Data-Retention Flip-Flops for Power-Down Applications"; 0-7803-8251-X/04; ISCAS 2004; 4 pages.

Rzehak, V.; Texas Instruments Deutschland; "Low-Power FRAM Microcontrollers and Their Applications"; White Paper; SLAA502-Jun. 2011; 7 pages.

Borgeson, J.; Texas Instruments; "Ultra-low-power pioneers: TI slashes total MCU power by 50 percent with new 'Wolverine' MCU platform"; White Paper, Feb. 2012; 9 pages.

Sheikholeslami, et al.; "A Survey of Circuit Innovations in Ferroelectric Random-Access Memories"; Proceedings of the IEEE, vol. 88, No. 5, May 2000; 23 pages.

Texas Instruments; "MSP430x5xx and MSP430x6xx Family"; User's Guide, ECCN 5E002 TSPA; Literature Number: SLAU208M; Jun. 2008-revised Feb. 2013; 1148 pages.

Texas Instruments; "MSP430FR59xx Mixed-Signal Microcontrollers", Data Sheet; SLAS704B; Oct. 2012-revised May 2014; 130 pages.

Masui,S., et al.; "Design and Application of Ferroelectric Nonvolatile SRAM and Flip-Flop with Unlimited Read/ Program Cycles and Stable Recall"; IEEE 2003 Custom Integrated Circuits Conference; 4 pages.

Texas Instruments; "MSP430FR573x, MSP430FR572x Mixed-Signal Microcontrollers", Data Sheet; SLAS639G; Jul. 2011-revised Apr. 2013; 111 pages.

* cited by examiner

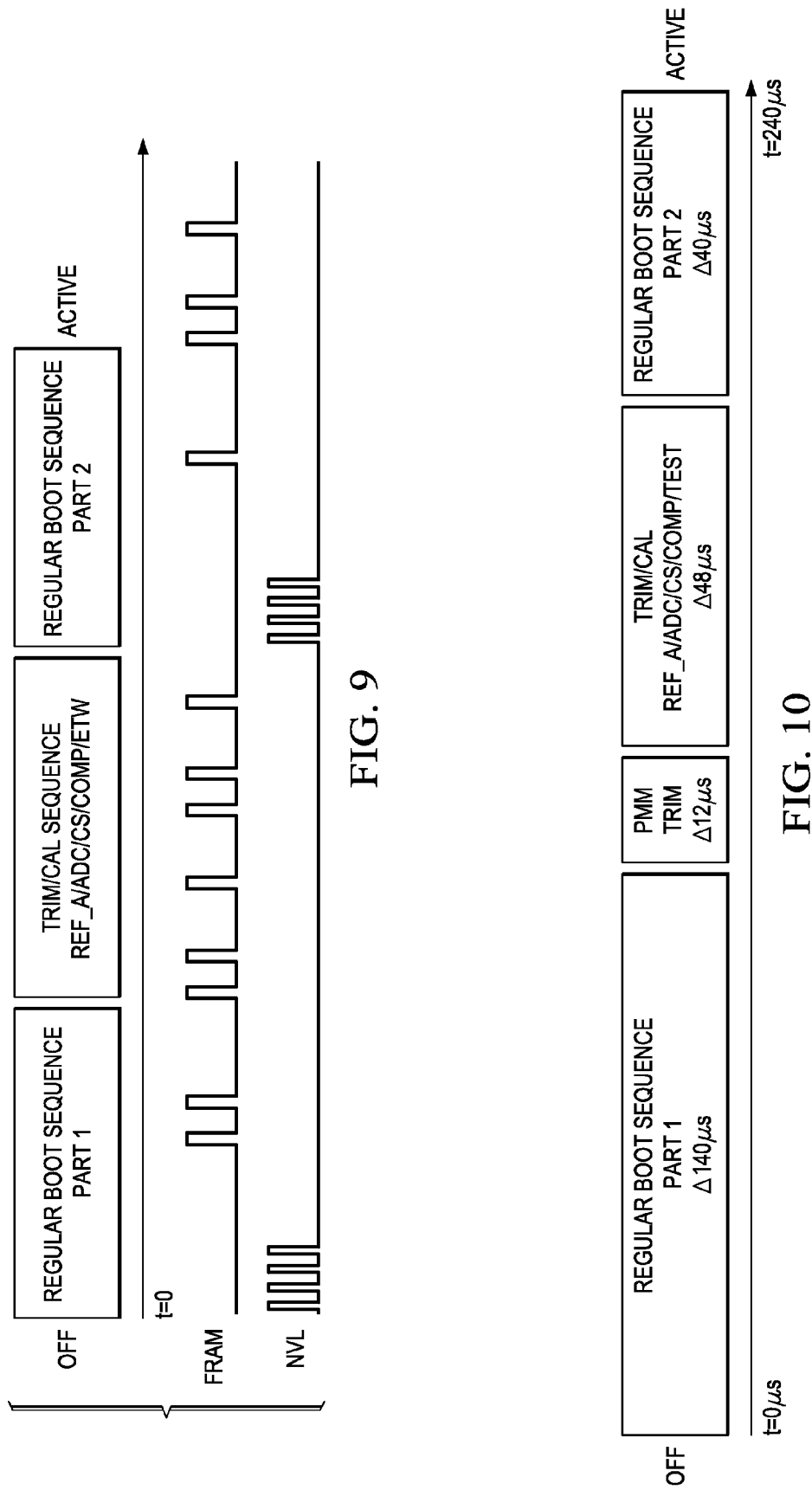

NON-VOLATILE LOGIC BASED PROCESSING DEVICE

RELATED APPLICATION(S)

This application claims the benefit of U.S. Provisional Application No. 61/881,687 filed Sep. 24, 2013 and U.S. Provisional Application No. 61/886,901 filed Oct. 4, 2013, both of which are incorporated by reference in their entireties herein.

TECHNICAL FIELD

This invention relates generally to processing devices that use non-volatile memory devices.

BACKGROUND

Non-volatile logic (NVL) is a ferro-magnetic random access memory (FRAM) based state retention technology that combines characteristics of FRAM memory with current data retention methods. Generally speaking, FRAM's comprise a non-volatile memory technology that typically operate by changing the polarity of a capacitor dielectric to switch between two stable states having corresponding different capacitive values. These two stable states correspond to stored "1's" and "0's."

More specifically, the fundamental storage element of FRAM is a ferroelectric capacitor. FIG. 1 illustrates a ferroelectric capacitor 105 used in a 1T-1C (one transistor—one capacitor) FRAM memory cell. The capacitor 105 can be polarized "up" or "down" by applying a positive or negative electrical field to it. The voltage for this operation is provided by a standard MOSFET circuit in a WL/BL/PL (word line/bit line/plate line) based memory circuit with a transistor 110. Consequently, the FRAM behaves similar to DRAM (dynamic random access memory) with regard to changing the charge of the capacitor. The primary difference is that a ferroelectric capacitor retains its state permanently.

Major characteristics of FRAM include: 1) FRAM is nonvolatile, implying that the data information is retained when no power is attached to the FRAM cell; 2) FRAM has similar read/write times compared to SRAM (static random access memory) and provides random access without memory segmentation; 3) the write energy is extremely low because FRAM can be accessed by a default power domain, VDD, in a system on a chip (SoC) architecture and does not require a charge pump like flash memory; and 4) FRAM provides higher endurance compared to floating gate memories because FRAM accesses do not degrade to the storage cell.

Thus, FRAM combines the advantages of RAM and nonvolatile memories, particularly with respect to having short read/write times, which are similar to SRAM, and low power consumption. Moreover, FRAM provides practically unlimited endurance because the read/write cycles of a single cell are in the order of $10^{15}$ cycles.

The ferroelectric capacitor consists of a film of crystalline structure between the two electrode plates. FIG. 2 illustrates the crystal in detail. The ferroelectric dipole is formed by a zirconium/titanium (Zr/Ti) atom and oxygen (O) atoms within the lead (Pb) crystal. The material is therefore called lead-zirkonate-titanate (PZT).

By applying an appropriate electrical field across the crystal, the mobile Ti atom moves from one stable state ("Up Polarization") to another stable state ("Down Polarization") within the crystal lattice. With increasing field strength the mobile atom crosses the barrier formed by the O atoms and flips to the second stable state, thus changing the polarization state of the unit cell. Because the state of the mobile Ti atom is retained after the power is removed, the ferroelectric dipole is non-volatile. The behavior of the PZT material results in a hysteresis loop, which can be compared to the magnetic BH curve.

In a read process, the current charge of the ferroelectric capacitor is sensed by using the ferroelectric capacitor as one capacitor in a capacitor divider. Depending on the stored data, one of two different voltages are gained on the bitline placed as the middle node of the capacitive divider, which voltages are then developed by a sense amplifier. Because this procedure has impact on the current state of the dipole, the read value has to be restored into the capacitor again. This step usually takes place directly in the same read sequence. The write and read control sequences are already known from current DRAM operations.

SUMMARY

Generally speaking and pursuant to the following embodiments, a processing device is configured to boot or wake using a one or more non-volatile logic element arrays that store a machine state of the processing device. While ferro-electric (FRAM) based non-volatile technology is used within this disclosure to show one potential approach, those skilled in the art can easily see that other non-volatile memory technologies can be used to implement the NVL arrays and program/data storage that are described. Some examples of alternative non-volatile technologies are MRAM, spin-torque MRAM, RRAM, FLASH, and the like.

More specifically, a standard boot sequence is used to implement a first portion of a boot or wake process to determine a first portion of data and restoring, in parallel with the standard boot sequence, a second portion of data from the one or more non-volatile logic element arrays. A data corruption check is performed on the second portion of data. If the data corruption check confirms the second data's validity, a standard boot sequence is used to implement a third portion of the boot to restore a third portion of data. If the data corruption check determines that the second data is invalid or that the boot is an initial boot such that the one or more non-volatile logic element arrays are empty, a standard boot sequence is executed to determine the second portion of data, which is then stored in the one or more non-volatile logic element arrays. This approach can be used, for example, to restore trimming and calibration data for the processing device while eliminating the time used to restore such data using a standard boot sequence. Energy savings are also realized in such an approach. In a worst case where the second portion of data is found invalid, the processing device boots in a same amount of time as using a standard boot sequence.

By one approach, the processing device may use other non-volatile devices for other aspects of the boot and/or wake process. In such a case, the processing device may be configured to restore the second portion of the data during a portion of the boot and/or wake process that is not otherwise reading data from other non-volatile devices to avoid overloading the power domain in which the other non-volatile devices operate.

By still another approach, control and test registers can be added to the processing device, which registers can be accessible by user code during a user mode of the processing device. So configured, a user can directly inspect the data state of the one or more non-volatile logic element arrays for monitoring and testing the operation of the processing device. These and other benefits can be determined through study of the accompanying figures and description.

BRIEF DESCRIPTION OF THE DRAWINGS

The above needs are at least partially met through provision of the non-volatile logic based processing device described in the following detailed description, particularly when studied in conjunction with the drawings, wherein:

FIG. 9 comprises a timing diagram illustrating interleaved timing of accessing an FRAM device versus accessing an NVL array during a boot sequence in accordance with various embodiments of the invention;

FIG. 10 comprises a timing diagram of an example standard cold boot sequence;

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
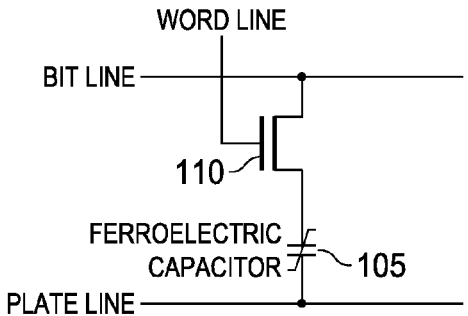
FIG. 1 comprises a circuit diagram of a prior art FRAM implementation.
Figure 2:
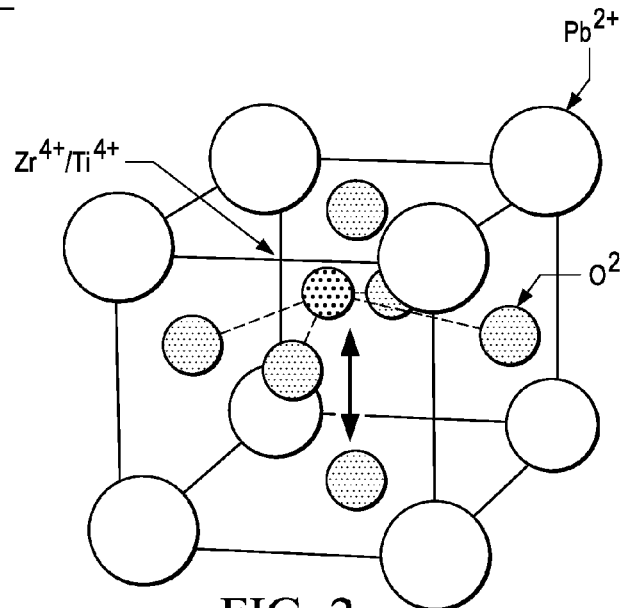
FIG. 2 comprises a molecular diagram of a prior art implementation of a crystal used in an FRAM implementation.
Figure 3:
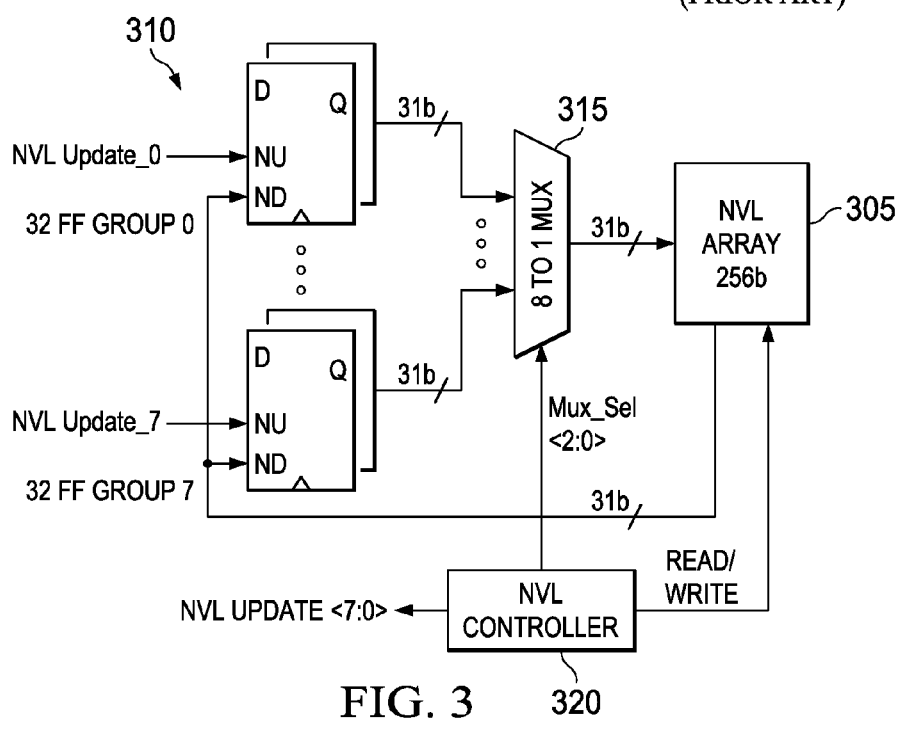
FIG. 3 comprises a schematic diagram of an NVL array configuration in accordance with various embodiments of the invention.

Referring now to the drawings, and in particular to FIG. 3, it may be helpful to first briefly describe one approach to non-volatile logic array technology. In this example approach, NVL technology provides state retention for a processing device called a "system on a chip" or SoC by storing/restoring data from DFFs to/from non-volatile logic arrays (henceforth abbreviated as NVL arrays). It will be understood that the teachings provided here can be applied to other processing device architectures and non-volatile memory technologies other than FRAM (for example, MRAM, spin-torque MRAM, RRAM, FLASH, and the like). Generally speaking, the current state of a retention data flip flop (RDFF, used to store system operation data) is stored to NVL arrays before the internal power for the processing device for a given domain is lost. When the domain is powered again, the data is directly restored from NVL arrays to the RDFFs. This procedure makes even the powering of the retention latch during a low power mode unnecessary. The NVL arrays consist of one or more arrays in which each array can have the same organization or can be uniquely configured per NVL array instance. For example, each array can be configured as an array of X entries (e.g., array rows) by Y bits (e.g., number of bits per row). Typically, these NVL arrays are distinct in construction and usage as compared to non-volatile code/data memory as implemented in the processing device's design. In this example, the non-volatile storage is provided in arrays having 256 FRAM based non-volatile logic bitcells. Because the NVL structure is based on multiple NVL arrays, they can be placed next to the NVL data flip flop (DFF) clouds to optimize routing overhead in the chip layout.

In the example of FIG. 3, the NVL array 305 contains the FRAM cells (although other non-volatile technologies such as MRAM, spin-torque MRAM, RRAM, FLASH, and the like can be used as the non-volatile storage element used inside NVL arrays). NVL DFFs 310 are grouped in clouds of 31 bits and are connected to the NVL array 305 via an 8-to-1 multiplexer 315. The NVL controller 320 coordinates the NVL operations. For instance, the operations of the NVL controller include triggering the control signals of the NVL DFFs, providing the control sequences to the NVL array, and handling the data input multiplexer.

To control the NVL array in the SoC example, the NVL controller 320 supports the following main different operations: Write-to-NVL storage, Read-from-NVL storage, Read-from-NVL storage (incl. Writeback), and Initialize FRAM in addition to a number of other specialized operations needed for device testing and debug. As explained above, one of the FRAM characteristics is that a read operation from the bitcell is destructive and the value must be written again into the bitcell (hence the definition of a read-with-writeback operation). Moreover, the NVL technology features a parity function to check whether the NVL array content is corrupted. Therefore in each row access a parity value is generated and evaluated. If the parity result is invalid, the NVL controller will stop the current operation and deliver a fail signal.

In this example, the NVL array 305 consists of eight rows, each containing 32 bits (e.g. 31 data bits plus one parity bit=32 bits in total per row). Because a parity value is stored in every row, the effective size of one NVL array is overall 248 bits. Moreover, the FRAM cells in the example NVL array are built on a unique 4C-12T architecture including a local sense amplifier to improve robustness by creating high read signal margins of the ferroelectric capacitors. Other design approaches and use of other non-volatile memory technologies, however, are possible.

Figure 4:
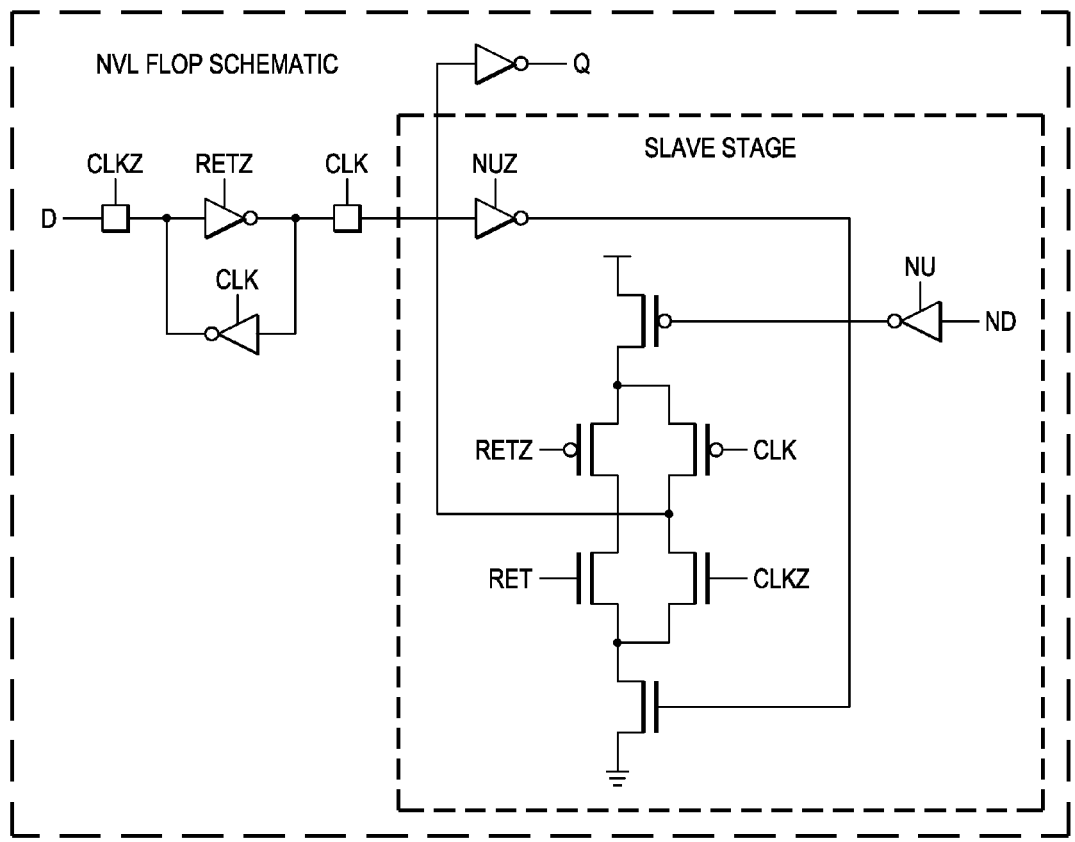
FIG. 4 comprises a schematic diagram of an NVL data flip flop configuration in accordance with various embodiments of the invention.

The NVL DFFs are basic RDFFs but with 2 modifications to provide NVL functionality. The adjustments concern the slave latch of the RDFF and are illustrated in FIG. 4. To be able to transfer the data from the NVL array to the DFFs, an additional data input (ND) was added to the slave stage of the RDFF. The data update process is enabled by a dedicated NVL update signal (NU), which is provided by the NVL controller. After the update signal is triggered, the current data from the NVL array is transferred into the DFF. Through adding only an input to the RDFF, the NVL DFF retains all functions of the default DFF with negligible impact to the speed and power consumption of the RDFF.

Figure 5:
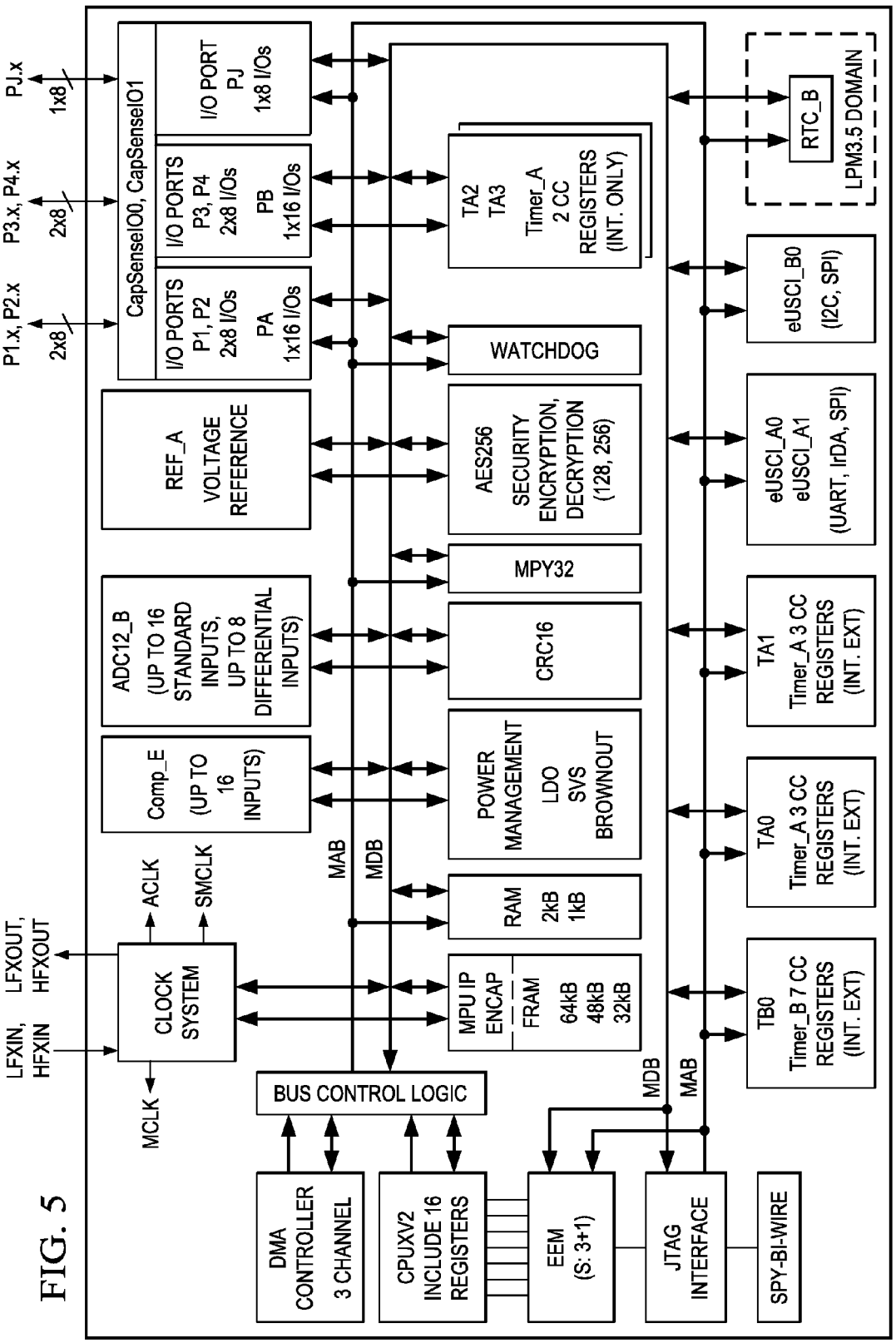
FIG. 5 comprises a functional block diagram of a processing device as configured in accordance with various embodiments of the invention.

The NVL arrays operate within the context of a processing device. FIG. 5 illustrates one such processing device within which the NVL arrays and functionality described in this disclosure may be applied, although other processing devices and architectures can use such arrays and functionality. The figure illustrates a mixed signal processor including a 16-bit CPU (central processing unit), dedicated code/data memory, and various peripheral components connected by a 16 bit wide address/data bus.

The processing device's design allows for different peripheral configurations to serve a wide range of applications. FIG. 5 depicts one example architecture in a functional block diagram with all available peripherals. The peripheral set includes for instance an A/D converter, a comparator, Watch Dog Timer (WDT), I2C/SPI/UART serial communication peripheral(s), Direct Memory Access (DMA) module, hardware multiplier, real-time-clock, capacitive I/O system, and a set of timers.

One feature of the processing device is, besides its wide application range, low energy consumption. The operating power of the processing device can be lowered to a level consuming current less than 1 µA. This low value is reachable because the processing device contains a peripheral structure with modular activity, flexible clocking modes, and an advanced energy management that refers to one or more different low power modes (LPMs). When the processing device is active, implying the CPU is operating, the device has the highest energy consumption of approximately 100 µA/MHz. During the low power modes, several modules are powered down to save energy, such as the CPU, non-volatile code/data storage module (main FRAM array, or main FLASH array, or the like used for CPU code/data storage), or peripherals. The individual connections of the peripherals from the power supply are based on a dedicated power domain structure of the processing device. Every power domain offers a separate switchable power supply which is able to disconnect the power supply (e.g., VDD) input of the corresponding module. During the deepest available low power modes, LPM3.5 and LPM4.5, the device powers only basic sustaining circuits like a brownout reset or the I/O interface. Consequently, the processing device consumes only 20 nA in LPM4.5. Because LPM3.5 and LPM4.5 have similar sleep/wakeup processes, they are summarized as LPMx.5.

One feature of the low power modes is state retention, which is a method to retain the state of a module (or even of an entire domain) while the domain is powered down. By maintaining the state of the module, the corresponding functionality is ensured when the device wakes up again such that no additional re-configuration or re-boot is required. State retention refers particularly to maintain the contents of sequential logic memory cells such as flip-flops, latches, and the like.

Figure 6:
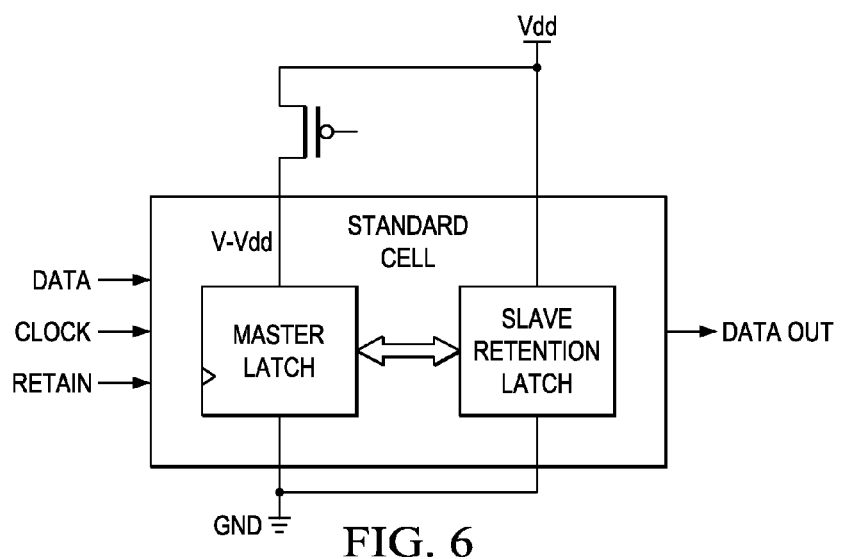
FIG. 6 comprises a functional diagram of a data flip flop circuit.

State retention is, for instance, provided by an implementation of specific retention data flip-flops (RDFFs) in data registers. FIG. 6 illustrates schematically the structure of an RDFF. More specifically, the default DFF contains a retention latch that retains the state during a low power mode. This retention latch has a dedicated VDD line that is always powered. When the retention signal (RETAIN) of the RDFF is enabled, the current DFF logic value is maintained within the retention latch by an always on voltage supply. Thus, the entire power domain is prepared for a shut down. If the power domain is powered again in the wakeup process, the data of the retention latch will be available and enables logic operations to resume. Hence, the data registers obtain their initial state as before entering the low power mode.

During certain low power modes, however, state retention is not applied to the configuration flops of particular modules, such as the RTC and I/O module. As a consequence, the control registers in these modules have to be re-configured manually by user instructions after wakeup from those low power modes. Additionally, the processing device contains several modules that are operating with mixed (analog/digital) signals. The mixed signal operations require precise analog reference parameters for several analog functions. Therefore, general common (family) trim or individual die-specific calibration values are applied to meet the required analog performance. These methods are referred to collectively as "trim/cal," and the data related with these is referred to as "trim/cal data."

Typically, every processing device must pass a final production test in which the analog calibration parameters are determined. For instance in an initial configuration process, the compensation values are calculated, stored to the embedded memory of the processing device, and transferred to the mixed signal peripherals during a boot phase. The trimming and calibration effect is volatile because the modules are not retaining the trim/cal data when the device is powered down or entering into a deep sleep low power mode. Thus, the trim/cal values are applied to the appropriate modules from the embedded memory at device startup, reset, and wakeup from the deep low power mode.

In one application, the trimming and calibration method is applied to following analog modules: ADC (Analog-Digital-Converter); CS (Clock System); REF A (Shared Reference); COMP (Comparator); PMM (Power Management Module); and TEST TOP (Generic Test Register Top Module).

The trim/cal data is written into dedicated registers during the digital bootcode execution. This part of the digital bootcode execution is called the trimming and calibration sequence (trim/cal sequence). The registers used for this purpose are generic test registers, which are separate registers for test, debug, and trim/cal purpose. From the generic test registers, the trim/cal DFF outputs are connected to the analog part of the module. For instance, there are 4 bits inside a REF A generic test register to adjust the REF A internal bandgap reference to corresponding voltage levels. The generic test registers are integrated into all analog modules and are built on the same uniform structure. The number of the generic test registers in each module differs and is related to the requirements and scope of every trim/cal module.

Additionally, NVL arrays can be used directly by end user applications. Through fast and low energy store of data contents, it is possible to backup the SOC state upon interruption of the external power supply. To realize this idea, the power supply of the SOC must provide the required energy for the NVL operations to complete. In current NVL based devices, a dedicated internal or external capacitor provides the energy for NVL based operations after the power loss of the device. In addition, the user might be interested in data or signals for monitoring the device or that indicate a cause of shutdown for the device. This data can also be stored during the shutdown process and read in the next user mode.

Figure 7:
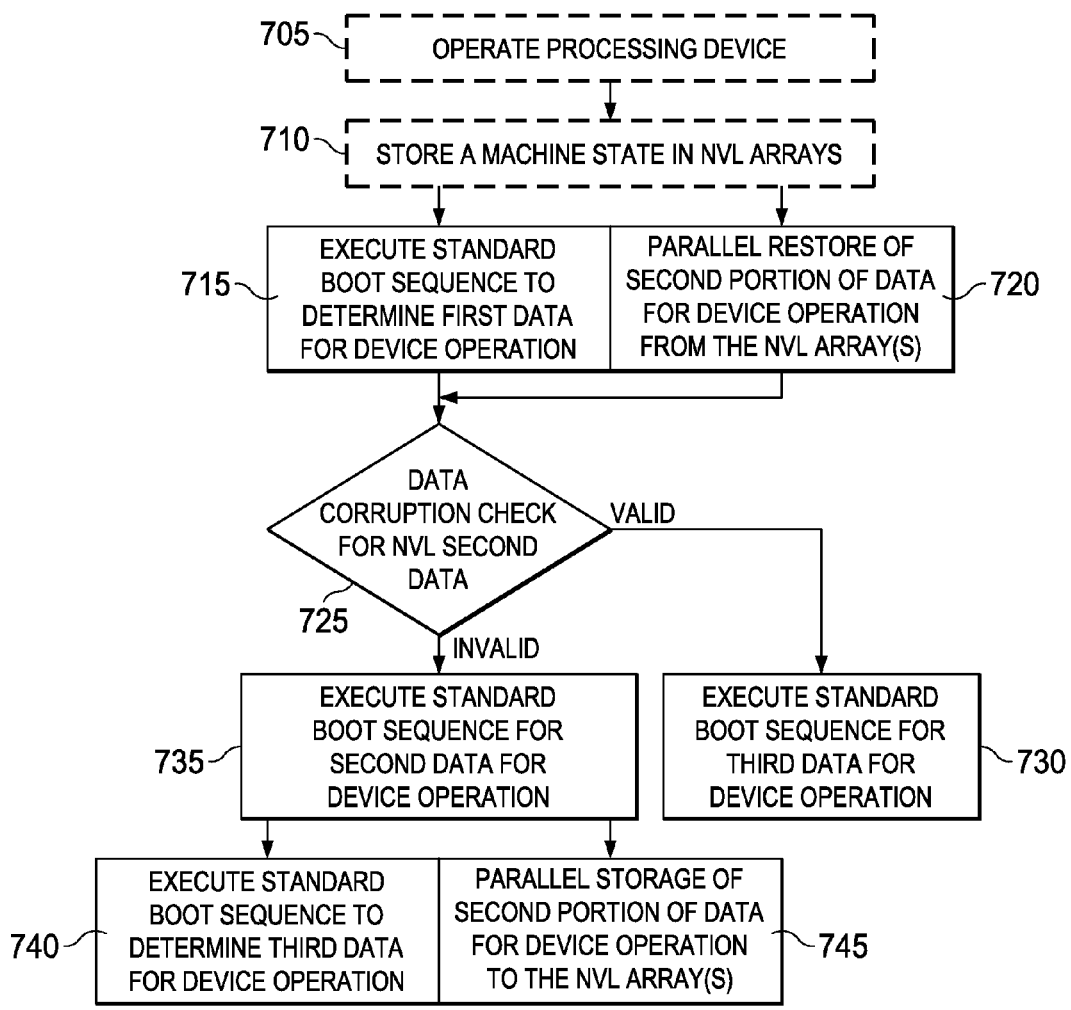
FIG. 7 comprises a flow diagram of an example operation of a processing device as configured in accordance with various embodiments of the invention.
Figure 8:
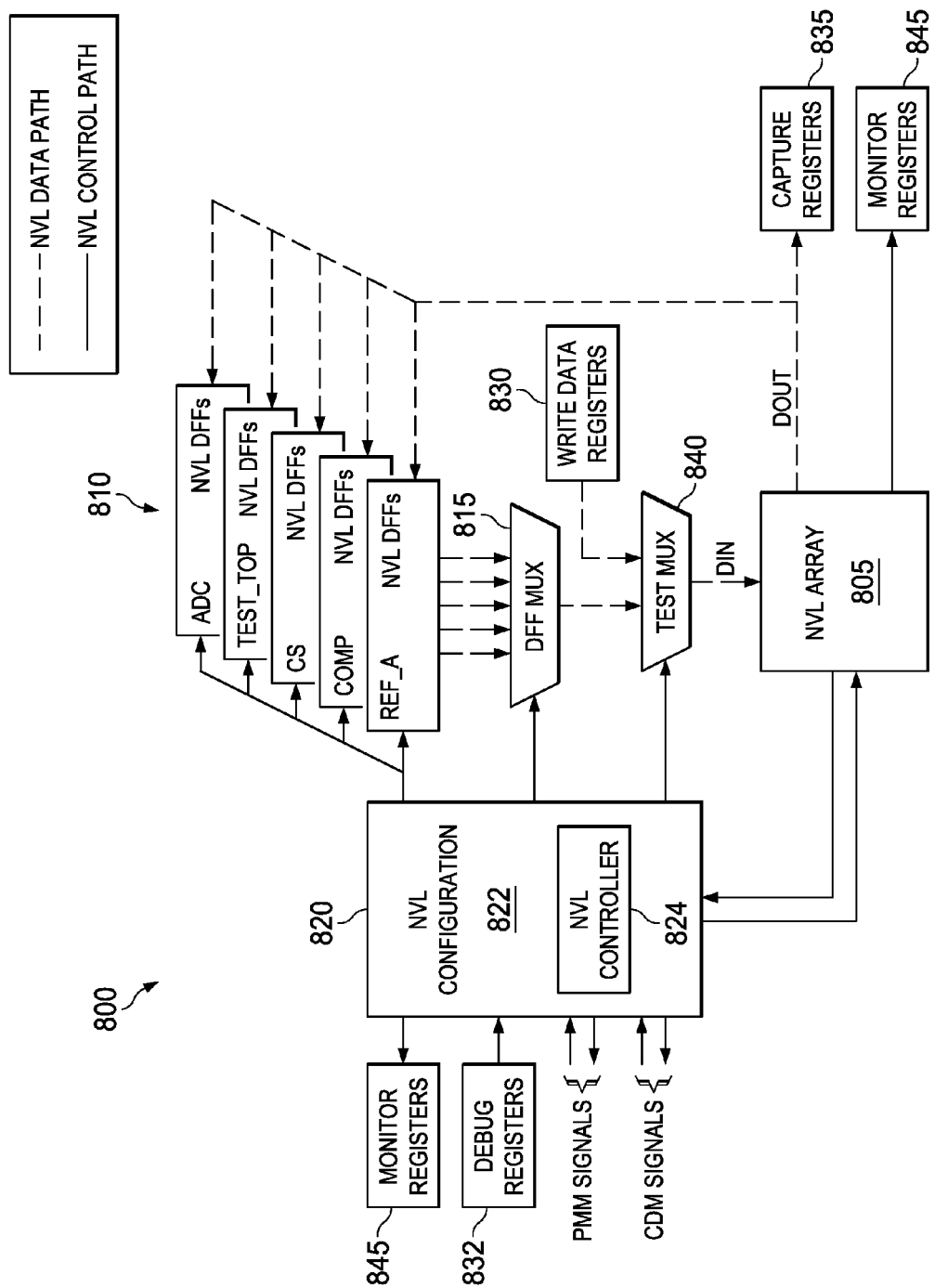
FIG. 8 comprises a schematic diagram of an example NVL implementation in a processing device as configured in accordance with various embodiments of the invention.

Generally speaking, therefore, and with reference to FIGS. 7 and 8, the processing device 800 can operate 705 using plurality of storage elements, which can be volatile or non-volatile, to execute at least one function. The processing device 800 in this instance includes a one or more non-volatile logic (NVL) arrays 805, a plurality of data flip flop circuit elements 810 (illustrated as being standard retention style flip flop circuits with an additional NVL data port on the slave stage, but may be non-retention flip flop circuits with an additional NVL data port on the slave stage in other approaches), and a data flip flop multiplexer 815 connected to pass data from the plurality of data flip flop circuit elements 810 to the one or more NVL arrays 805. The processing device 800 further includes at least one processing element 820 configured to execute a non-volatile configurations logic 822 and a non-volatile logic controller logic 824. Those skilled in the art will recognize and appreciate that such a processing element 820 can comprise a fixed-purpose hard-wired platform or can comprise a partially or wholly programmable platform. It is also possible, however, to view this illustration as comprising a logical view, in which case one or more of these elements can be enabled and realized via a shared platform. It will also be understood that such a shared platform may comprise a wholly or at least partially programmable platform as are known in the art. All of these architectural options are well known and understood in the art and require no further description here.

The processing element 820 is configured to control the data flip flop multiplexer 815 and the NVL mini-array 805 to store 710 a machine state represented by the plurality of data flip flop circuit elements 810 in response to entering a backup mode. When booting (such as from a cold start) or waking (such as from a low power mode), the processing device 800 executes 715 a standard boot sequence to determine at least a first portion of data for operations executed by processing device 800. The determination of the data can include copying data from a non-volatile code/data memory such as FRAM or Flash memory to the data flip flop circuits, transferring data from NVL arrays to the NVL data flip flops, and/or evaluating best suited calibration values. Also, this first portion of data may be a portion of data not suitable for restoration from an NVL storage in a given application as described in the example below.

The device 800 also restores 720, in parallel with the executing 715 of the standard boot sequence to determine the at least the first portion of data, at least a second portion of data from the one or more non-volatile logic element arrays 805 for operations executed by the processing device 800. The second portion of data is different from the first portion of data, which typically would be the case when reconstituting a machine state during a boot or wake process. By one approach, this parallel restoration includes restoring trimming and calibration data relating to a first set of trimming/calibration modules for the processing device 800. This would eliminate the need to re-determine the trimming and calibration data for certain modules where that data is likely still fully applicable. Also, this restoration 720 can start after the start of execution 715 of the standard boot sequence but still be in parallel with a majority of the standard boot sequence 715 or at least a portion of the standard boot sequence.

After restoring the second data, the processing device 800 executes a data corruption check 725 for the at least the second portion of data to confirm validity of the at least the second portion of data. The data corruption check can be any suitable data confirmation process such as a parity check, Error correction/detection code (ECC), or the like. The phrase "parity check" refers to those aspects that are in common with various state of the art error detection and/or correction coding methods that are in use now and in the future. In response to the data corruption check confirming validity of the at least the second portion of data, the processing device 800 executes 730 a standard boot sequence to determine at least a third portion of data for operations executed by the processing device 800. The third portion of data is different from the first portion of data and different from the second portion of data. On the other hand, in response to the data corruption check detecting invalid data, the processing device 800 executes 735 a standard boot sequence to determine at least the second portion of data for operations executed by the processing device 800 and executes 740 a standard boot sequence to determine the third portion of data for operations executed by the processing device 800. Thus, if the second data restored from the NVL arrays is bad or corrupted in some manner, it can be readily replaced by running the otherwise standard boot sequence. During a boot process for the computing device, the data corruption check will determine the presence of invalid data where there is an un-programmed non-volatile logic element array of the one or more NVL mini-arrays 805, as may be the case in a first cold boot for the device. In response to the determining the presence of invalid data where there is the un-programmed non-volatile logic element array, the processing device 800 executes a standard boot sequence to determine data for the un-programmed non-volatile logic element array.

To avoid increased wakeup or boot time in the case of determining that the restored second data is invalid, the processing device 800 can store 745, in parallel with the execution 740 of the standard boot sequence to determine the third portion of data, in the one or more NVL mini-arrays 805 the second portion of data determined using the standard boot sequence. In this manner, a later boot or wakeup process can realize the time and energy savings of restoring the second data from the NVL arrays 805, and the standard wake or boot time in determining and saving that second data is not lengthened because the storage of the second data happens in parallel with the standard boot process for the third data.

In the case where the processing device 800 reads data from non-volatile code/data storage device(s) during the standard boot sequences for determining the first and third portions of data, it is possible that these non-volatile code/ data storage devices operate in the same power domain as the NVL arrays 805. In this case, to avoid overtaxing the power supply for the shared non-volatile memory power domain, the processing element 820 causes the non-volatile configurations logic and the non-volatile logic controller logic to execute the storing 745 of second data, in parallel with the execution of the standard boot sequence to determine the third portion of data, in the one or more non-volatile logic element arrays at a time other than when the standard boot sequence reads code/data from the non-volatile code/data storage devices either when determining the first or third data. Similarly, the restoring 720 of second data, in parallel with the executing 715 of the standard boot sequence to determine the at least the first portion of data, from the one or more non-volatile logic element arrays can be controlled to occur at a time other than when the standard boot sequence reads data from the FRAM devices either when determining the first or third data. FIG. 9 illustrates the resulting interleaving of the NVL array activity and the system code/data accesses to the main non-volatile code/data storage device. The NVL array activity occurs only when non-volatile code/data memory is not being accessed. The interleaving can be controlled or enforced via hardware, software, or a combination of both techniques. Interleaving access of the NVL array and the main non-volatile code/data storage device provide advantages including avoiding the need to increase the size or capacity of the voltage regulator, avoiding the need to increase the size of supply decoupling capacitor, and avoiding the need to increase the quiescent current of the voltage regulator, all of which reduces the implementation cost and complexity for the described NVL architecture implementation. Additionally, the interleaving can help avoid a processing device execution hazard where both the NVL and software try to access the same registers or flip flops at the same time.

Specific examples of the above described boot sequence using the NVL arrays are illustrated in FIGS. 10-15. Although these examples illustrate the parallel nature of the NVL restore happening immediately at the beginning of the respective boot sequences, this exact timing is not necessary such that the parallel restore and storing of data can happen at various points of the standard boot sequence. FIG. 10 shows the schematic draft of a standard cold boot sequence of the example processing device of FIG. 5. In this example, the regular boot sequence part 1 is followed by the PMM trimming sequence and the trimming sequence of the remaining trim/cal modules (REF A, ADC, CS, COMP, TEST TOP). After the last part of the regular bootcode—the regular boot sequence part 2—the device reaches the user mode after approximately 240 µs. The user mode is defined as the time when user code is executed from the device. Although the process is described primarily for the cold boot and low power mode wakeup processes, the reset bootcode sequence is identical to the cold boot sequence and considered to be therefore a part thereof. We use the phrase "standard boot" to refer to those aspects that are in common with both a cold boot, wakeup boot, and reset boot process.

Figures 11, 12:
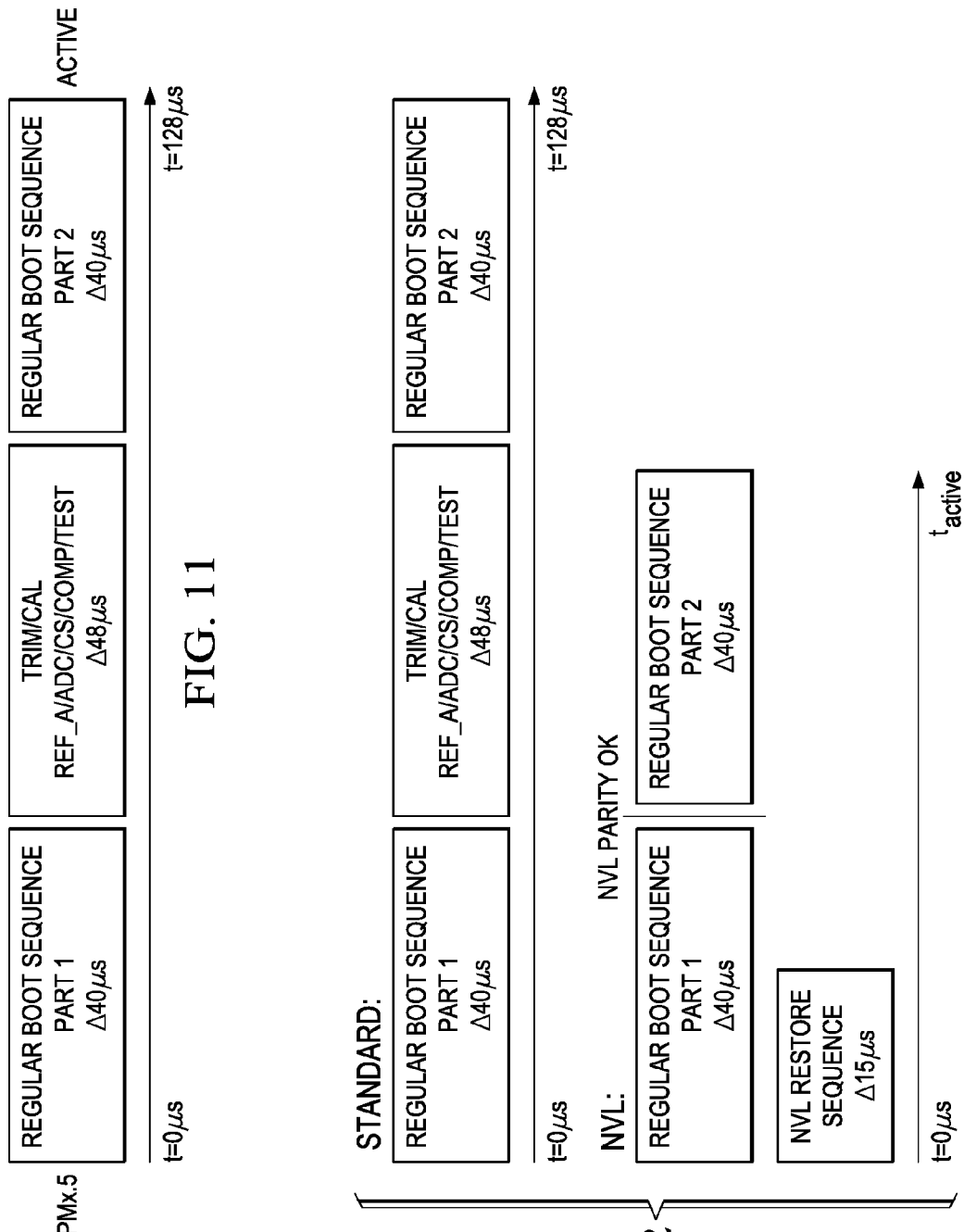
FIG. 11 comprises a timing diagram of an example standard boot sequence from a low power mode.
FIG. 12 comprises a timing diagram comparing timing of an example standard boot sequence from a low power mode and an example boot sequence from a low power mode using an NVL array approach in accordance with various embodiments of the invention.

The low power mode LPMx.5 wakeup sequence, illustrated in FIG. 11, is similar to the cold boot sequence but with certain deviations. First, the regular boot sequence part 1 takes 40 µs because several boot tasks are only executed in the cold boot sequence (for example, a CRC check is performed on one or more sections of the main code/data memory to verify data integrity). Second, the PMM trim/cal sequence is omitted in FIG. 11 because the PMM generic test registers are retained (not shut down) in the low power mode LPMx.5. The other two parts, trim/cal sequence and regular boot sequence part 2, are identical to the cold boot process. The device reaches the user mode after approximately 128 µs.

To realize multiple savings in time and energy in this example, the trim/cal data is restored parallel to the regular low power mode LPMx.5, cold boot, and reset sequences such that no standard trim and calibration boot sequence is required. Furthermore, the parity function of the NVL array ensures a correct boot or wakeup process of the device in case of failure of the NVL data restore. Hence, a parity check right after the NVL restore process is included in the bootcode—if the parity check result determines invalid data, either the data itself or the parity bit, the regular trim/cal sequence will be executed, and the device will perform the boot process regularly. Then an additional store-to-NVL sequence stores the correct trim and calibration data to the NVL array. This store sequence is initiated after the regular trim/cal sequence that restores the correct data (this sequence is necessary as the NVL arrays are backing up data from the registers or flip flops. Ergo, the flip flops or registers must contain the data to be backed up before NVL store operations can be initiated). Similar to the initial NVL restore process, the NVL store operations are executed parallel to the regular boot process.

Figure 13:
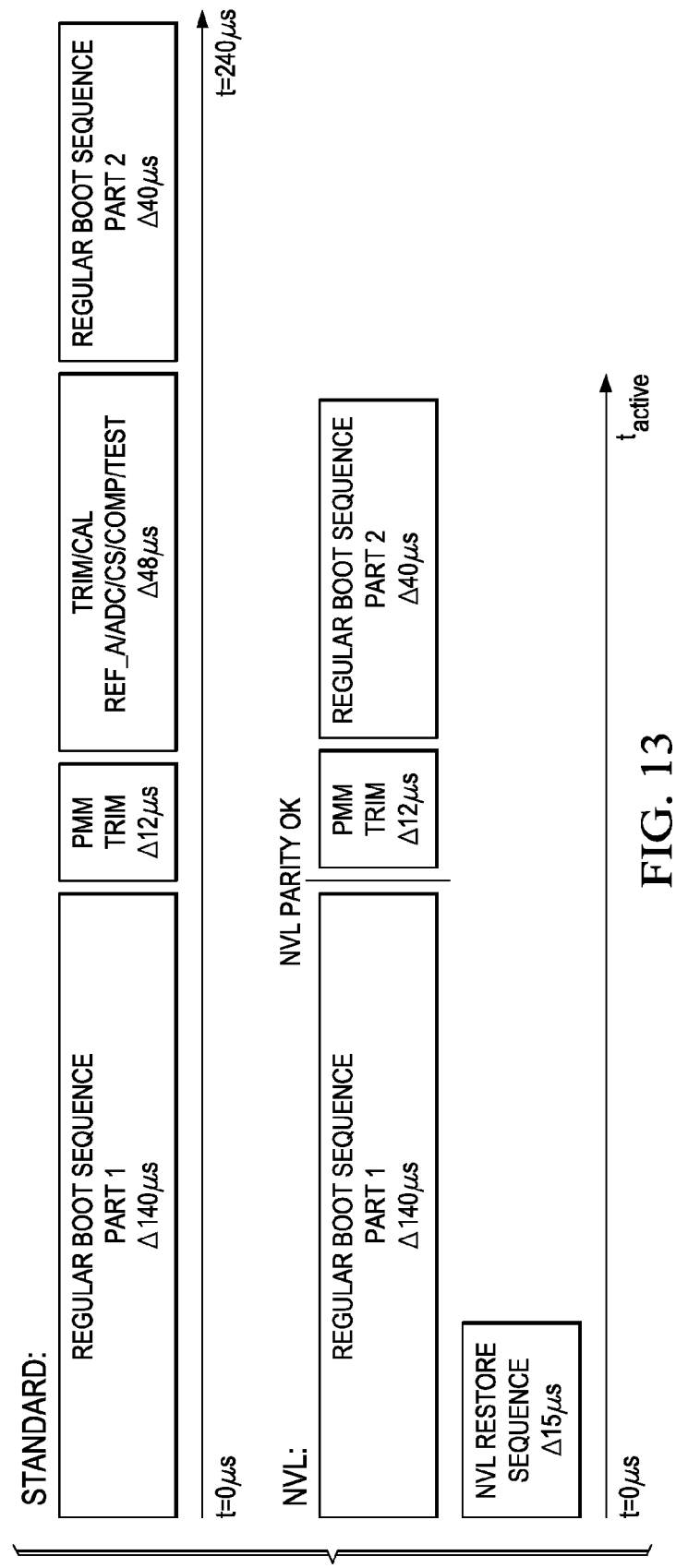
FIG. 13 comprises a timing diagram comparing timing of an example standard boot sequence from a cold boot and an example boot sequence from a cold boot using an NVL array approach in accordance with various embodiments of the invention.
Figure 14:
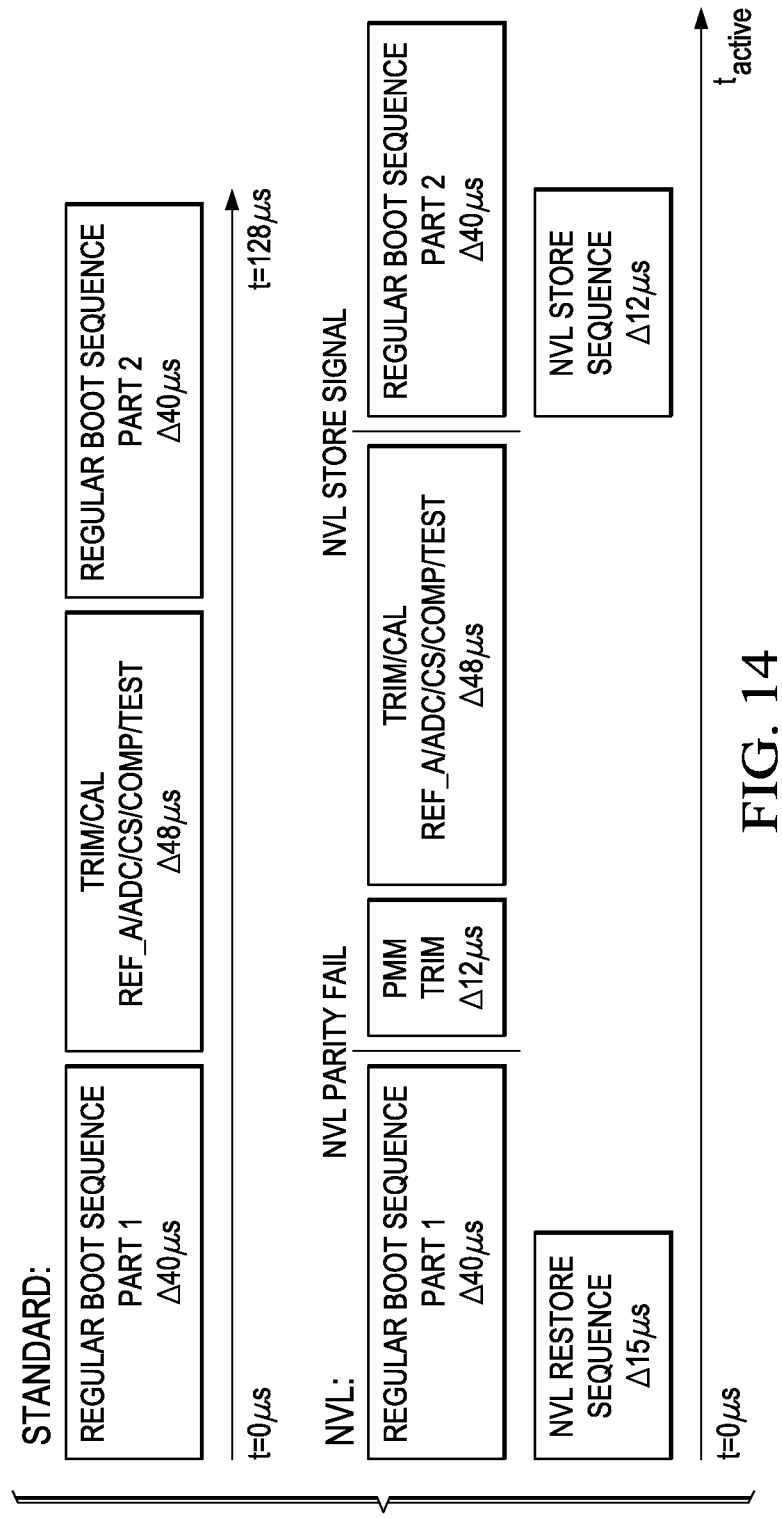
FIG. 14 comprises a timing diagram comparing timing of an example standard boot sequence from a low power mode and an example boot sequence from a low power mode using an NVL array approach with a parity check fail in accordance with various embodiments of the invention.
Figure 15:
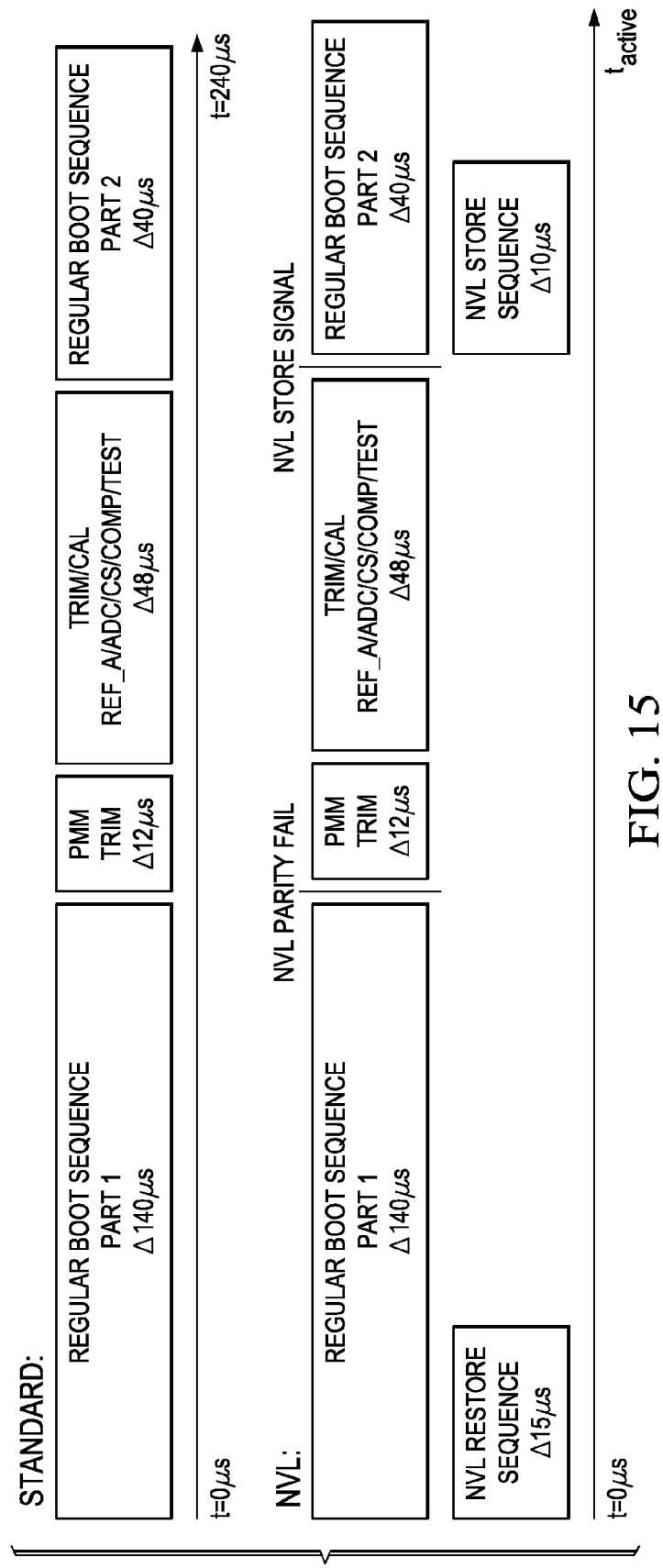
FIG. 15 comprises a timing diagram comparing timing of an example standard boot sequence from a cold boot and an example boot sequence from a cold boot using an NVL array approach with a parity check fail in accordance with various embodiments of the invention.

Special attention was paid to the fact that the device reaches the user mode in an error free condition from every start condition, even when the NVL restore process was invalid. Therefore, the NVL bootcode concept ensures that the device reaches the user mode with correctly trimmed generic test registers under all conditions. Even if some of the conditions are extremely rare, they must be dealt with to ensure correct device operation. Consequently, in the described example, there exist four different scenarios for the cold boot/LPMx.5 and parity correct/fail conditions (there can be more or less than four scenarios in other devices). FIGS. 12 and 13 illustrate the parity valid scenarios whereas FIGS. 14 and 15 refer to the parity invalid cases. These NVL timing conditions are based on following assumptions: 1) the NVL operations are based on the use of a clock source with a fixed speed of 5 MHz (NVL read/write performance is proportional to clock speed and thus speeds up or slows down based on the operating frequency of the clocks that are available in any particular embodiment of the invention) and 2) the NVL operations are based on the implementation of one NVL array handling 256 bits for this example embodiment. Operations on multiple NVL arrays in other example implementations can be executed parallel or in series. The latter will cause extended NVL operation times.

To implement the NVL concept in the boot and wakeup processes, a modification of the prior bootcode is made. In the specific implementation discussed above, only one additional trigger signal is required for the bootcode sequence. All other NVL trigger signals are default top-level events. Consequently, the modification efforts of the bootcode can be kept low, and the basic principle of the NVL bootcode concept can be reduced to one basic bootcode modification: If the parity result from the NVL restore process is 1) valid: skip the trim/cal sequence OR 2) invalid: execute the regular trim/cal sequence. The check of the NVL array parity signal is inserted in the bootcode flow directly before the regular trim sequence. At this point, the parity check signal is calculated and stable. Because the additional parity check sequence is executed in every bootcode run, it is recommended that the necessary boot code operations be short and efficient.

Registers Used for Testing, Controlling, and Monitoring the Processing Device

In addition to the boot and wake up efficiencies, the NVL arrays can be accessed and/or utilized in a number of ways for debugging and monitoring operation of the processing device 800. In one approach, the processing device includes control and test registers accessible by user code during a user mode of the processing device 800. The at least one processing element 800 can then execute the non-volatile configurations logic 822 and the non-volatile logic controller logic 824 to implement testing or monitoring of the processing device's operation through application and monitoring of the control and test registers. The control and test registers 850 may include one or more of each of the following in any combination: control and debug registers 832, result status monitoring registers 845, read data capture registers 835, and write data registers 830. In one example, the control and test registers include at least one NVL control register 832 where the processing device 800 controls a debug mode by accessing bits inside the at least one debug register 832 to support one or more of: signal margin control, fast debug pattern generation, single row processing, timing adjustments, and application of defined voltages to the non-volatile bitcells of the NVL mini-arrays 805. In short, the implementation of the various registers described herein allows access to bits in the NVL array 805 bits in the NVL array 805 that may be otherwise inaccessible.

For example, the control and test registers can include at least one read data capture register 835 directly connected to an output of a NVL array of the non-volatile logic element arrays 805. Here, the at least one processing element 820 executes the non-volatile configurations logic 822 and the non-volatile logic controller logic 824 to capture data from the non-volatile logic element arrays 805 during a debug operation by capture registers 835 and to provide access to the data in the capture registers 835 by user software. For instance, the processing element 820 can execute the non-volatile configurations logic 822 and the non-volatile controller logic 824 to capture certain data from the one or more non-volatile logic arrays 805 during a debug operation, store the certain data in the capture register 835 as a bit array, and to provide access to the bit array in the capture register 835 by the user code for testing of the bit array at one time. This approach is much faster and easier than checking data bit by bit in the NVL FF based machine registers 810, which may require hundreds of instructions to accomplish.

In still another example, the processing device 800 includes a test multiplexer 840 connected to receive data from the data flip flop multiplexer 815 or from a write data test register 830. In this example, the at least one processing element 820 directs the non-volatile configurations logic and the non-volatile logic controller logic to select input data from the write data test register 830 for the testing or the monitoring of the processing device's 800 operation by writing the appropriate control information into the NVL control registers 832, resulting in the enabling of the appropriate data input to the test multiplexer 840. For instance, the device may write particular data to the write data register 830 and write the particular data from the write data register 830, via the test multiplexer 840, to a specific portion of the one or more non-volatile logic arrays 805. Then, during a debug operation, the particular data is read from the one or more non-volatile logic arrays 805 to a capture register 835 of the control and test registers for evaluation.

With this architecture a variety of other testing, control, and monitoring abilities can be realized. For example, the following example debug options can be implemented in the top-level debug registers:

Execution of all standard operations of the NVL controller: Initialization, Read, Read+Writeback, Write Single row access—each row of the NVL array can be addressed manually Complete reset of the integrated NVL system device specific debug operations to force parity and reset values device specific debug operations to force input values of the NVL array.

In addition to debug features, the registers can capture and store several monitoring or result signals or flags from the integrated NVL system. Some monitoring signals of the top-level debug registers are listed as follows: current parity signal from the NVL array; parity result from the recent NVL restore process; a completion signal indicating that the desired NVL operation has finished; and bootcode has passed the NVL parity check without errors. Some of these signals are monitored during the wakeup process and have to be stored in DFFs for later access via the user application. The NVL configuration module 822 can control the storage process integrated into the processing device's environment.

Because the bootcode concept with the generic test registers in the trim/cal modules does not cover the complete bit count of the array, it would not be possible to write all NVL array rows and access all bits with a defined dataset. For test reasons and referring again to FIG. 8, an additional test multiplexer 840 is integrated to select the input data either from the NVL DFFs 810 or from a dedicated test register 820. With the additional multiplexer 840, all rows of the NVL array can be set to defined values and either written into the NVL DFFs or read by the capture registers. The control signals for the NVL array input multiplexer are generated by the NVL configuration module. Alternatively, to save integration effort and area, the same generic test register can be used as capture and test data register, because the DFF outputs of the register are connected straight to the NVL test data MUX, and the read signals for the CPU interface are directly connected to the 31 bit wide NVL array output. So configured, the testability of the additional NVL components is addressed through implementation of overall four additional generic test registers that are accessible by user code during the user mode of the device. Therefore, the debug options can be used to investigate failures of the device via software control without requiring direct I/O access or additional hardware equipment.

Example Hardware Implementation

FIG. 8 illustrates an overview of one example implementation. The center of the integrated components represents the NVL configuration logic 822, which is wrapped around the NVL controller 824. This module is the interface of the NVL control logic to the processing device's 800 digital toplevel domain. It uses this approach in this configuration because while the NVL controller 824 provides a range of possible NVL functional and debug/test operations, additional logic is needed to integrate the NVL control functionality with the top-level signals that control the processing device 800 overall sequencing and operation during the various operating modes of the processing device 800 and also control the transitions between operating modes. The NVL configuration logic 822 evaluates relevant top-level signals and provides the input signals to the NVL controller 824. The NVL configuration logic 822 is served with inputs from the processing device's 800 PMM, clock distribution module (CDM), the debug/control registers 832, and the NVL array 805. The NVL configuration logic 822 operating in concert with the NVL controller 824 also provides the control signals to the NVL DFFs 810, the NVL array 805, and the data multiplexers 815 and 840 for the NVL array 805 input. The data and status outputs of the NVL array 805 are connected to the NVL DFFs 810 and to the capture registers 835 and monitoring registers 845 respectively. Further, the monitoring and debug registers as described above are also connected to the NVL configuration logic and the NVL array.

Some of the primary tasks of the NVL configuration logic 822 include: generating the NVL controller inputs from: debug registers, processing device digital top-level signals, and PMM and CDM signals; looping the signals from the NVL controller to: NVL array 805, NVL DFFs 810, and multiplexer 815; and generating the control signals for the array test input multiplexer 840 and capture registers 835.

To save the trim/cal standard boot sequence, an implementation of NVL DFFs into the trim/cal modules ADC, CS, REF A, COMP and TEST TOP is realized. Although this implementation is described within the scope of an NVL implementation of one trim/cal module into the SoC environment, these teachings can be applied in other contexts. In this example, there are 50 standard DFFs replaced with NVL DFFs in the REF A module. The replacement is executed by a netlist modification script written in generic form and which can be extended for other trim/cal modules. The generic structure leads to a lowered effort in completing the NVL DFF integration into the remaining trim/cal modules. The netlist script includes the modification routines for two trim/cal modules. The generic structure of the script allows implementation extensions without high effort.

Figure 16:
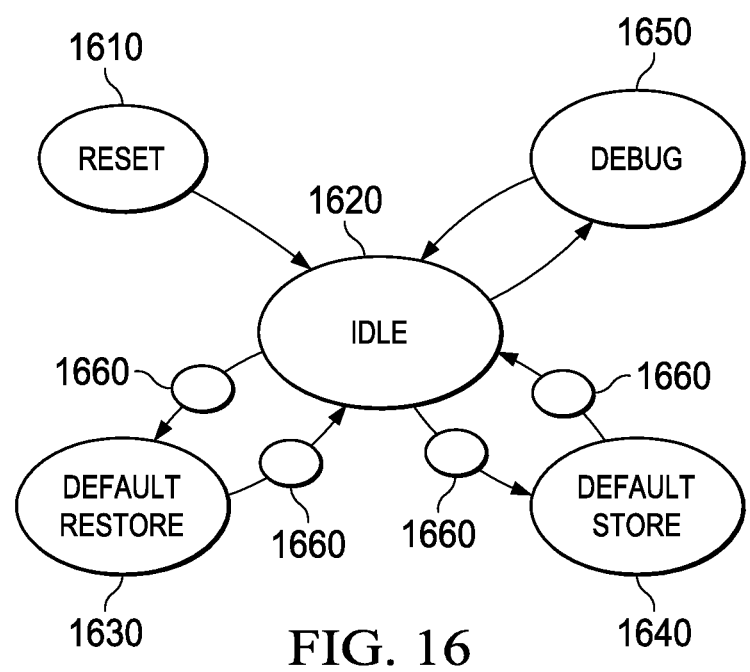
FIG. 16 illustrates an NVL configuration logic state diagram in accordance with various embodiments of the invention.

The basic function of the NVL configuration 822 is to evaluate relevant top-level signals and to provide the correct input signals for the NVL controller 824. To handle these interface signals, the control logic of the NVL configuration 822 is based on a mealy state machine. The state machine contains nine states that are depicted in FIG. 16. The major transfer conditions and functions of the states are as follows. The Reset state 1610 is triggered by the system reset. The result is a complete reset of all instances in the module. After reset release the next state is always Idle 1620. Idle is the default mode when no other mode is active and reset is inactive. It is reacting on input signals from the digital toplevel to initiate the Default Restore, Default Store or Debug sequence. Entry into the Default Restore state 1630 is initiated by the brownout (BOR) reset release directly at the beginning of the boot process. Exit from the Default Restore state 1630 is triggered by a "done" or "fail" signal from the NVL controller 824. While in the default restore state 1630, appropriate control signals are presented to the NVL controller 824 that initiate the read+writeback operation. The Default Store 1640 mode is entered when the state machine receives a signal indicating that the NVL restore process failed and also that the regular trim/cal sequence has completed. Exit from the default store 1640 is triggered by a done from the NVL controller 824. While in the default restore store 1640, appropriate control signals are presented to are presented to the NVL controller 824 that initiate the write operation. The Debug mode 1650 is accessed via debug register operations in the user application where the user has complete access to the NVL controller 824. The Debug mode 1650 is stopped by the user application via subsequent additional debug register operations.

The four smaller drawn states 1660 were added after the behavioral simulation to provide additional stability for certain NVL controller 824 output signals by preventing simultaneous changes of input signals of the NVL controller 824. The additional states keep the NVL controller logic 824 in a defined local reset state while the NVL controller input signals are being changed. With this modification, the NVL controller 824 provides the output waveforms correctly for the NVL array 805. All sequential elements in the module have a dedicated reset input and are served by a 5 MHz clock.

The secondary function of the NVL configuration 822 is to evaluate and store important signals of the NVL system for monitoring reasons. Hence, additional combinational logic and DFFs are integrated to store, for example, the parity check value, from the standard NVL restore process. The DFF output signals are connected to the read interface in the generic test registers and are therefore accessible via a user application.

Results for One Example Implementation

To help describe the benefits of the described approach, the boot time and energy consumption of the NVL based bootcode are compared to the default bootcode version in both the applications of cold boot and of LPMx.5 wakeup. Furthermore, the integration cost of the NVL system is calculated and compared to the default, unmodified processing device. The conclusions in this section refer to the implementation of the complete trim/cal bootcode concept. All presented data concerning the boot time is related to simulated timings and technical data from internal documentation. As part of the concept, the impact on the boot sequences applies to the digital part of the processing device's start sequences.

To ensure the redundancy of the cal/trim sequence, a check of the recent NVL parity value is performed as described above. Because this check is executed in every boot sequence, special focus was put on the efficiency of the test operation. Finally, the time for the software boot code assessment of the NVL restore parity check result was reduced to 2.25 µs.

Because LPMx.5 wakeup and cold boot have different boot times (compare FIGS. 10 and 11), two different results are obtained regarding the proportion of saved time in the overall boot process. The following equation depicts the result of saving the trim/cal sequence during the LPMx.5 wakeup (illustrated in FIG. 12) with an overhead of 2.25 µs for the additional parity check:

$$t_{NVL,LPMx.5}=129.5\ \mu s-(48\ \mu s-2.25\ \mu s)=83.75\ \mu s$$

where $t_{Default,LPMx.5}=129.5$ µs, $t_{Trim/Cal}=48.0$ µs, and $t_{Check}=2.25$ µs. The processing device reaches the user mode after 83.75 µs, which is approximately 35% faster than the default digital wakeup time.

Furthermore, the boot time for the cold boot was improved by the NVL integration as illustrated in FIG. 13. The following equation shows that the NVL based cold boot sequence lasts 192.75 µs which is approximately 19.2% lower than in the default case.

$$t_{NVL,ColdBoot}=238.5\ \mu s-(48\ \mu s-2.25\ us)=192.75\ us$$

where $t_{Default,ColdBoot}=238.5$ µs, $t_{Trim/Cal}=48.0$ µs, and $t_{Check}=2.25$ µs.

In addition to time savings, energy regularly spent on executing the trim/cal sequence by the CPU is saved. However, the additional energy caused by the NVL system for the restore process, and the additional NVL restore check sequence must be considered, too. The calculation of the default power consumption for the trim/cal sequence is based on the assumptions: $t_{Trim/Cal,CPU}$=48 µs, $I_{Device,Trim/Cal}$=270 µA, and $U_{Dig\_Top}$=1.2 V.

The average current of 270 µA for the device covers a clock speed of 4 MHz and an FRAM access rate of 3% during the trim/cal sequence. Consequently, the overall energy costs of trimming the device by the CPU are: $E_{Trim/Cal,CPU}$=48 µs*270 µA*1.2 V=15.6 nJ. In comparison to the default processing device, the energy consumption of the NVL system is based on two main parts: The restore costs of the trim/cal data for the complete NVL system and the additional boot code verification of the parity check result have to be considered in the calculation: $E_{NVL,DataRestore}$=2.325 pJ/bit*256 bit=0.595 nJ and $E_{CheckSequence}$=2.25 µs*240 µA*1.2 V=0.648 nJ. The current consumption of 240 µA of the processing device during the NVL restore check sequence is lower in contrast to the trim/cal sequence because no FRAM is accessed in this time. Both parts, NVL operations and the check sequence, result in a required energy of 1.24 nJ for the complete NVL restore process: $E_{Trim/Cal,NVL}$=$E_{NVL,DataRestore}$+$E_{CheckSequence}$=1.243 nJ. The energy of the default trim/cal sequence (15.6 nJ) compared to the NVL trim/cal process (1.24 nJ) results in a difference of approximately 92% in favor of the NVL integration. Thus, the NVL energy spent on the trim/cal process is almost negligible in contrast to the energy consumption of the default sequence.

The following energy calculations of the entire boot processes cover the average consumption in nJ of the basic parts of the boot sequences. The energy values cover the operating frequencies of the device and an adequate FRAM cache hit rate. Hence, the overall energy consumption of the digital parts of cold boot and LPMx.5 wakeup of the default device is calculated as follows:

$$E_{LPMx.5,Default}=E_{Part1}+E_{Trim/Cal}+E_{Part2}$$

such that $E_{LPMx.5,Default}$=11.4 nJ+15.6 nJ+7.8 nJ=34.8nJ, and $$E_{ColdBoot,Default}=E_{Part1}+E_{Trim/Cal}+E_{Part2}$$

such that $E_{ColdBoot,Default}$=55.5 nJ+15.6 nJ+7.6 nJ=78.7 nJ.

The energy calculations for the NVL complete boot process include the saving of the trim/cal sequence, but also the additional NVL check and the restore energy of the NVL system, where $$E_{LPMx.5,NVL}=E_{Part1}+E_{Part2}+E_{Trim/Cal,NVL}=20.4 \text{ nJ},$$
and $$E_{ColdBoot,NVL}=E_{Part1}+E_{Part2}+E_{Trim/Cal,NVL}=64.3 \text{ nJ}.$$

Because the trim/cal sequence causes a considerable part of the overall digital LPMx.5 wakeup energy, the NVL version has a lower energy consumption of about 41%. Consequently almost half of the digital LPMx.5 wakeup energy is saved by the NVL trim/cal version. In contrast to the LPMx.5 wakeup, the influence of the trim/cal sequence on the overall cold boot energy consumption is lower but still approximately 18% of the energy is saved by the NVL implementation. The results concerning the energy consumption are comparable to the results in boot time in the cold boot scenario. Also, the NVL implementation saves a significant part of the LPMx.5 wakeup time and even a higher part of the LPMx.5 wakeup energy.

Regarding an LPMx.5 application that wakes up periodically, for instance caused by an I/O interrupt, the digital bootcode execution might become a considerable part of the overall execution time and energy of the application. The shortened digital bootcode of the NVL application allows a faster entry in the user mode and leads again to a faster entry into the LPMx.5. Thus, the time normally spent on the boot process is transferred to LPMx.5 sleep time, and the device only consumes LPMx.5 power instead of the power dissipation during the wakeup process. The influence of the digital bootcode on the overall energy consumption is highest when the wakeup interval and the user code sequence are short.

Implementation costs include an increased chip area required for the NVL implementation. The biggest portion is required for the NVL array, which uses 1.45% of the complete area of the digital toplevel domain, and the NVL configuration logic including the integrated NVL controller, which uses 0.43% of the complete area of the digital toplevel domain. The overhead caused by NVL DFFs and the NVL array MUX structure is in total 0.54% of the complete area of the digital toplevel domain. The test structures, which have an additional required area of 0.17%, obtain the smallest part in the calculation. This amounts to an overall 2.59% additional area caused by the NVL implementation compared to the entire digital domain area of the unmodified processing device.

Next, the results in the case of NVL restore failures will be described. A parity error occurs when the NVL array is started the first time with un-programmed FRAM cells. Another cause of a parity error might be when the data inside the NVL array is corrupted during the normal usage of the device. Although these events come with some energy costs, recent results of study of the NVL technology indicate that the NVL FRAM cells have high reliability. Also, cold boot events should be rare events for an ultra-low power battery powered device. Accordingly, the benefits indicated in the earlier analysis of the described process will typically surpass any costs incurred when executing an error-based sequence.

With respect to boot time, if the recent NVL restore process was not successful, the default trim/cal sequence including the PMM trim/cal sequence will be executed. The additional NVL store sequence has no influence on the boot time because it is executed parallel to the regular bootcode. Thus, the overhead for the standard cold boot sequence due to the introduction of NVL functionality is only the additional NVL boot code verification of the NVL parity check during NVL restore operations (illustrated in FIG. 15), where $t_{ColdBoot,Failure}$=238.5 µs+2.25 µs=240.75 µs.

The NVL failure sequence has the same entry point in the NVL trim/cal register table at a cold boot and an LPMx.5 wakeup. Consequently, the additional NVL restore check, the default trim/cal sequence, and the PMM trim/cal sequence are executed in the LPMx.5 wakeup failure sequence (illustrated in FIG. 14), where $t_{LPMx.5,Failure}$=129.5 µs+2.25 µs+12 µs=143.75 µs. Thus, the NVL failure sequence results in an increased boot time of 0.9% for the cold boot and 11.0% for the LPMx.5 wakeup compared to the default boot time.

With respect to energy consumption, the NVL failure sequence contains the additional NVL store sequence of the correct trim/cal data. This additional sequence requires no additional boot time because the NVL store operation is executed parallel to the regular bootcode execution. However, the NVL store sequence requires additional energy. The energy costs of the NVL store sequence are calculated as follows: $E_{NVL,DataStore}$=2.759 pJ/bit*256 bit=0.706 nJ.

The overall result of the energy consumption in case of an NVL failure contains both the NVL restore/store sequence and the additional NVL check, where $E_{NVL,Failure} = E_{NVL,DataRestore} + E_{NVL,DataStore} + E_{CheckSequence} = 1.95$ nJ. Compared to the default execution, the boot processes including the NVL failure sequence result in a higher energy consumption of approximately 6% for the LPMx.5 wakeup and approximately 3% for the cold boot but NVL parity failure events are extremely rare by design so paying a small energy penalty in situations that almost never occur is a very reasonable tradeoff.

Other Approaches

Those skilled in the art will recognize that a wide variety of modifications, alterations, and combinations can be made with respect to the above described embodiments without departing from the scope of the invention. For instance, the above specific examples only apply the NVL implementation to five trim/cal modules, while the application of NVL to many more modules is possible. To reduce the chip area costs, the logic of the NVL controller for a specific use can be optimized to reduce gate count of the module thereby lowering the area and leakage power. Furthermore, the NVL controller might be modified based on a generic structure so that a setup for handling different numbers of NVL arrays is possible.

Also, the trim/cal data is stored once in the NVL FRAM array and is restored to the trim/cal registers at every LPMx.5 wakeup, reset, or cold boot. The data in the FRAM cells will be consistent during the lifetime of the device, assuming no parity error occurs. If an undetectable data corruption occurs in the array, the parity function will not notify the data failure. Then the NVL system will continually restore the corrupted trim/cal data. Hence, a periodically refresh of the trim/cal data after a certain number of boot processes might be an option to improve data integrity. The refresh could simply be triggered by initiating the NVL failure sequence. Consequently, the correct trim/cal data is restored by the bootcode at the next start of the device and will be stored automatically in the NVL array.

Another possible modification to the current NVL integration is to improve the performance of the NVL system. The NVL components are sourced by the 5 MHz MODOSC clock in the presented implementation. The NVL controller contains a state machine that is handling the output signals to the NVL array. Because the state machine is triggered directly by the clock source, the performance of the entire NVL operations is proportional to clock speed. The NVL architecture (controller, arrays, test/control registers, etc) are capable of very high speed operations; for instance in the first NVL implementation, the NVL controller was sourced by a 125 MHz clock. Because the described processing device does not provide such high frequency clock sources, higher clock frequency can be generated. This can be done, for example, by a dedicated oscillator circuit within the NVL configuration logic. The following calculations illustrate the difference between NVL operations sourced by 5 MHz and 125 MHz clocks for 1 NVL array:

$t_{Store,5MHz} = 7$ cycles/row*8 rows*$(5*10^6)^{-1}$ s=11.2 μs;

$t_{Restore,5MHz} = 9$ cycles/row*8 rows*$(5*10^6)^{-1}$ s=14.4 μs;

$t_{Store,125MHz} = 7$ cycles/row*8 rows*$(125*10^6)^{-1}$ s=448 ns;

$t_{Restore,125MHz} = 9$ cycles/row*8 rows*$(125*10^6)^{-1}$ s=576 ns.

The fast NVL operations using the 125 MHz clock take place in a very short time period and accordingly open opportunities for new NVL applications.

Besides the area optimization of the NVL controller, a reduction of the power consumption of the entire NVL system is possible. The NVL control logic, which controls the store and restore operations during the bootcode execution, is normally not required during the user code execution. In fact, an exception is the NVL debug mode. To save the redundant NVL energy, the NVL control logic can be placed in an appropriate power domain and shut down when no NVL operations are required.

Another possible modification includes application of these basic principles to other bootcode executions. The trim/cal sequence with its five trim/cal modules is one part of the digital bootcode execution. This example demonstrates that the NVL can handle bit transfer operations from NVL FRAM to data registers faster and more efficiently than the CPU. Those operations are present during the bootcode execution because data is usually read from ROM or FRAM and then written into configuration registers of the device. Therefore, further sequences of the bootcode might also be suitable for a NVL implementation.

Still another possible modification includes prioritizing steps of the restoration. The NVL DFFs are organized in clouds of 31 bits and are connected via the MUX structure to a dedicated row of the NVL FRAM array. During store and restore processes, the NVL rows are addressed in ascending order which implies that row 1 is accessed first and row 8 last at every read/write operation. This condition can be used as an advantage by connecting selected DFFs to the first rows of the NVL array. This might be useful if certain DFFs are in need of being restored earlier than the remaining data, or are for instance timing relevant for the MCU setup. One way to realize this concept is to assign the DFFs selected for the NVL integration with priority attributes in the netlist modification script. Thus, high priority DFFs are connected to lower rows of the NVL array. The idea might also be transferred to handle multiple arrays, causing specific DFFs to be connected to defined NVL arrays or even rows. In contrast, the NVL DFFs with no priority attribute are connected in regular order to the NVL array. Moreover, the routing of non-prioritized NVL DFFs might be optimized in the layout process by connecting them randomized to the closest NVL array.

Still another application includes the idea of NVL being controlled by NVL where method to restore intended or prioritized data from the NVL array first. Then the first restored data can be used to control the NVL system. An application is, for example, an NVL enable or disable value that can be set from the user that allows the user to disable or enable standard NVL operations. Another feature might be to store information of the NVL system, such as monitoring signals or counter values, which are evaluated at the beginning of NVL operations and leading to intended control operations. To realize this concept, it is only necessary to replace the DFFs in the NVL configuration register with NVL DFFs and to implement the appropriate control logic.

Yet another modification is to extend the concept of interleaving the access NVL and FRAM elements. The current NVL implementation separates the default FRAM and the NVL accesses to avoid a power supply failure caused by high peak currents. The idea of combining both technologies can be optimized so that they are supplied from the same power source and can be used almost at the same time. Consequently and advantageously, no modification of the FRAM power supply is required. The principal thought of FRAM interleaving allows the default FRAM operations to execute normally, and the NVL system operates such that no NVL operations are executed during this time. A possible option to avoid simultaneous accesses of both technologies is to use the same clock source for NVL and FRAM operations. In this case, an additional logic gates the clock signal to the system that is requesting an access. This idea covers both FRAM/NVL read and write accesses. By providing the clock signal only to one technology, parallel operations of NVL and default FRAM are reliably avoided. The impact on the default FRAM operations of the processing device can be minimized by prioritizing the default FRAM request to the request of the NVL system. Because the NVL read/write sequences are based on separate row operations, it is possible to interrupt the NVL operation after a row access when a standard FRAM request occurs. Therefore, the NVL system will pause its current operation, then the default FRAM access is served, and after the default FRAM access is completed, the NVL continues with the paused sequence. With this method, both systems might have to accept wait sequences until the other system is finished with its operation, but no additional changes on the FRAM power supply are necessary.

Such modifications, alterations, and combinations are to be viewed as being within the ambit of the inventive concept.

What is claimed is:

1. A method of booting or waking a computing device, the method comprising:
    executing a standard boot sequence to determine at least a first portion of data for operation of a processing device configured to store in one or more non-volatile logic arrays a machine state of the processing device in response to the processing device's entering a backup mode;
    restoring, in parallel with the executing of the standard boot sequence to determine the at least the first portion of data, at least a second portion of data from the one or more non-volatile logic arrays for operation of the processing device, the second portion of data being different from the first portion of data;
    executing a data corruption check for the at least the second portion of data to confirm validity of the at least the second portion of data;
    then:
        in response to the data corruption check confirming validity of the at least the second portion of data, executing a standard boot sequence to determine at least a third portion of data for operation of the processing device, the third portion of data being different from the first portion of data and different from the second portion of data,
        or
        in response to the data corruption check detecting invalid data, executing a standard boot sequence to determine at least the second portion of data for operation of the processing device and the third portion of data for operation of the processing device.

2. The method of claim 1 further comprising in response to the data corruption check detecting invalid data, storing, in parallel with the execution of the standard boot sequence to determine the third portion of data, in the one or more non-volatile logic arrays the second portion of data determined using the standard boot sequence.

3. The method of claim 2 wherein the standard boot sequence to determine the at least the third portion of data comprises reading data from non-volatile storage devices sharing a power domain with the one or more non-volatile logic arrays, and wherein the method further comprises executing the storing, in parallel with the execution of the standard boot sequence to determine the third portion of data, in the one or more non-volatile logic arrays the second portion of data determined using the standard boot sequence at a time other than when the standard boot sequence reads data from the non-volatile storage devices.

4. The method of claim 1 wherein the restoring, in parallel with the executing of the standard boot sequence, the at least the second portion of data from the one or more non-volatile logic arrays comprises restoring trimming and calibration data relating to a first set of trimming/calibration modules for the processing device.

5. The method of claim 1 wherein the standard boot sequence to determine the at least the first portion of data comprising reading data from non-volatile storage devices sharing a power domain with the one or more non-volatile logic arrays, and wherein the method further comprises executing the restoring, in parallel with the executing of the standard boot sequence to determine the at least the first portion of data, the at least the second portion of data from the one or more non-volatile logic arrays at a time other than when the standard boot sequence reads data from the non-volatile storage devices.

6. The method of claim 1 further comprising implementing testing or monitoring of the processing device's operation through application of control and test registers accessible by user code during a user mode of the processing device.

7. The method of claim 6 wherein the implementing the testing or the monitoring further comprises one or more of: debugging of execution of standard operations of a controller of the non-volatile logic arrays, accessing a single row of a non-volatile logic array of the non-volatile logic arrays for debugging, executing a complete resetting of a non-volatile logic element array system for the processing device, forcing parity values for the processing device, forcing reset values for the processing device, forcing input values for one or more of the non-volatile logic arrays, monitoring a current parity signal for a non-volatile logic array of the non-volatile logic arrays, monitoring a parity check result from a recent determination of the at least the second portion of data from a standard boot sequence, monitoring a restoration of data in the non-volatile logic arrays using the standard boot sequence, monitoring storage of data in the non-volatile logic arrays using the standard boot sequence, monitoring passing of bootcode after execution of the data corruption check without errors, or controlling a debug mode of the processing device by a controller of the one or more non-volatile logic arrays by accessing bits inside debug registers of the control and test registers to support one or more of: signal margin control, fast debug pattern generation, single row processing, timing adjustments, and application of defined voltages to non-volatile storage bitcells of the non-volatile logic arrays.

8. The method of claim 6 further comprising:
    capturing data from the non-volatile logic arrays during a debug operation by a capture register of the control and test registers directly connected to an output of a non-volatile logic element array of the non-volatile logic arrays; and
    providing access to the data in the capture register by user software.

9. The method of claim 6 further comprising selecting input data for the testing or the monitoring of the processing device's operation from either a data flip flop for a non-volatile logic array of the non-volatile logic arrays or from one of the control and test registers using a multiplexer.

10. The method of claim 1 further comprising during a boot process for the computing device, determining with the data corruption check the presence of invalid data where there is an un-programmed non-volatile logic array of the one or more non-volatile logic arrays, and in response to the determining the presence of invalid data where there is the un-programmed non-volatile logic array, executing a standard boot sequence to determine data for the un-programmed non-volatile logic array.

11. A computing device apparatus providing non-volatile logic based computing, the apparatus comprising:
   a processing device comprising:
      one or more non-volatile logic arrays;
      a plurality of data flip flop circuit elements;
      a data flip flop multiplexer connected to pass data from the plurality of data flip flop circuit elements to the one or more non-volatile logic arrays;
      at least one processing element configured to execute a non-volatile configurations logic and a non-volatile controller logic; and
      control and test registers accessible by user code during a user mode of the processing device,
   wherein the at least one processing element is further configured to execute the non-volatile configurations logic and the non-volatile controller logic to implement testing or monitoring of the processing device's operation through application of the control and test registers in response to application code.

12. The computing device apparatus of claim 11 wherein the control and test registers comprise at least one debug register,
   wherein the at least one processing element is further configured to execute the non-volatile configurations logic and the non-volatile controller logic to control a debug mode of the processing device by accessing bits inside the at least one debug register to support one or more of: signal margin control, fast debug pattern generation, single row processing, timing adjustments, and application of defined voltages to non-volatile storage bitcells of the non-volatile logic arrays.

13. The computing device apparatus of claim 11 wherein the control and test registers comprise at least one capture register directly connected to an output of a non-volatile logic array of the non-volatile logic arrays,
   wherein the at least one processing element is further configured to execute the non-volatile configurations logic and the non-volatile controller logic to capture certain data from the non-volatile logic arrays during a debug operation, store the certain data in the at least one capture register as a bit array, and to provide access to the bit array in the at least one capture register by the user code for testing of the bit array at one time.

14. The computing device apparatus of claim 11 further comprising a test multiplexer connected to receive data from the data flip flop multiplexer or from one of the control and test registers,
   wherein the at least one processing element is further configured to execute the non-volatile configurations logic and the non-volatile logic controller logic to select input data for the testing or the monitoring of the processing device's operation by controlling the test multiplexer.

15. The computing device apparatus of claim 14 wherein the control and test registers comprise at least one write data register configured to connect to the test multiplexer,
   wherein the at least one processing element is further configured to execute the non-volatile configurations logic and the non-volatile controller logic to write particular data to the write data register and write the particular data from the write data register to a specific portion of the one or more non-volatile logic arrays.

16. The computing device apparatus of claim 15 wherein the control and test registers comprise at least one capture register directly connected to an output of a non-volatile logic array of the non-volatile logic arrays,
   wherein the at least one processing element is further configured to execute the non-volatile configurations logic and the non-volatile controller logic to, during a debug operation, read the particular data from the one or more non-volatile logic arrays to a capture register of the control and test registers for evaluation via the application code.

17. The computing device apparatus of claim 11 wherein the at least one processing element is further configured to execute the non-volatile configurations logic and the non-volatile controller logic to implement the testing or the monitoring by performing one or more of: debugging of execution of standard operations of a controller of the non-volatile logic arrays, accessing a single row of a non-volatile logic array of the non-volatile logic arrays for debugging, executing a complete resetting of a non-volatile logic element array system for the processing device, forcing parity values for the processing device, forcing reset values for the processing device, forcing input values for one or more of the non-volatile logic arrays, monitoring a current parity signal for a non-volatile logic array of the non-volatile logic arrays, monitoring a parity check result from a recent determination of an at least second portion of data from a standard boot sequence, monitoring a restoration of data in the non-volatile logic arrays using the standard boot sequence, monitoring storage of data in the non-volatile logic arrays using the standard boot sequence, monitoring passing of bootcode after execution of a data corruption check without errors, or controlling a debug mode of the processing device by a controller of the one or more non-volatile logic arrays by accessing bits inside debug registers of the control and test registers to support one or more of: signal margin control, fast debug pattern generation, single row processing, timing adjustments, and application of defined voltages to non-volatile storage bitcells of the non-volatile logic arrays.

18. A computing device apparatus providing non-volatile logic based computing, the apparatus comprising:
   a processing device comprising:
      one or more non-volatile logic element arrays;
      a plurality of data flip flop circuit elements;
      a data flip flop multiplexer connected to pass data from the plurality of data flip flop circuit elements to the one or more non-volatile logic element arrays;
      at least one processing element configured to execute a non-volatile configurations logic and a non-volatile controller logic,
   wherein the non-volatile configurations logic is configured to evaluate inputs regarding the processing device's toplevel and to provide inputs to the non-volatile controller logic;
   wherein the non-volatile controller logic is configured to control activity of the one or more non-volatile logic element arrays and the data flip flop multiplexer.

19. The apparatus of claim 18 wherein non-volatile configurations logic is based on a state machine.

20. The apparatus of claim 19 wherein the state machine includes:

a reset state triggered by a system reset and that results in a reset of modules of the processing device followed by transition to an idle state;

the idle state that represents a state of inactivity of the processing device and which is configured to react to input signals from a top level domain of the processing device to initiate a default restore state, a default store state, or a debug state;

the default restore state configured to be initiated by a system reset release at a beginning of a boot process and stopped by a signal from the non-volatile logic element array regarding a restore process;

the default store state configured to be entered in response to a boot sequence determination of data to store in the non-volatile logic element array;

the debug state configured to be accessed and stopped by a user application.

* * * * *